UNITED STATES PATENT OFFICE.

CHARLES G. VAN FLEET, OF LOS ANGELES, CALIFORNIA, ASSIGNOR TO BAXTER TODD AND HOWARD W. MILLS, OF SAME PLACE.

COMPOSITION OF MATTER FOR MANUFACTURING GLASS.

SPECIFICATION forming part of Letters Patent No. 607,003, dated July 5, 1898.

Application filed July 14, 1896. Renewed February 3, 1898. Serial No. 669,019. (No specimens.)

*To all whom it may concern:*

Be it known that I, CHARLES G. VAN FLEET, a citizen of the United States, residing at Los Angeles, in the county of Los Angeles and State of California, have invented a new and useful Composition of Matter to be Used for the Manufacture of Glass, of which the following is a specification.

The object of my invention is to produce for use in the arts a material suitable for many or all of the uses to which glass is applied and for uses to which ordinary glass cannot be applied because of brittleness, said material being superior to common glass in its freedom from liability to fracture.

My invention also has for its object to produce a glass especially adapted for use as an insulating material for electricity and which, owing to its strength and freedom from fracture under sudden and extreme changes of temperature, is particularly applicable for employment in connection with engines driven by gas, gasolene, or other inflammable matter for the generation of electricity, and also in connection with other electric appliances where insulators are needed of greater strength and higher insulating qualities than those now known.

My newly-invented glass is a vitreous product which is characterized as containing a silicate or silicates, magnesia, alumina, and water, combined with a suitable flux, and which is in structure amorphous, non-crystalline, and free from grit. Such a product is distinguished from common glass by its superior strength, superior electrical insulating qualities, and absolute freedom from fracture under sudden and very great changes of temperature. The material may be heated to any temperature up to fusing and instantly cooled, in whole or in part to zero, without fracture.

The principal ingredients of the composition are as follows, compounded in the proportions named: silica, 46.19; iron protoxid, 4.70; iron oxid, 2.24; magnesia, 12.57; water, ten; alumina, eight; soda and potash, not estimated separately, approximately, 14.50. These ingredients I have found existing in about the proportions stated in an ore produced from a mine located near Claremont, in Los Angeles county, California, which is known in that locality as "green-paint ore." The silica exists in the ore as a silicate that is chemically combined with the bases magnesia oxid, (MgO,) iron oxid, (FeO,) &c., and does not exist as free silica or sand. The ore is distinguished as follows: Cleavage, imperfect; fracture, uneven; hardness, two to 2.5; flexible when wet; brittle when dry; color, dark serpentine green with some blue; luster, glistening, slightly subvitreous; smooth and unctuous to touch; free from grit; specific gravity, two to 2.5; structure, smooth non-crystalline.

To the above-named constituents, whether taken as the ore in its natural state or combined artificially, after the same have been suitably pulverized, is added a flux, preferably composed of litharge in about the proportion of two and one-half per cent. of the whole mixture; commercial borax, two and one-half per cent.; soda, (bicarb.,) one and one-half per cent. When such flux and the foregoing principal ingredients have been suitably mixed and fused, they will form a composition that may be defined as a combined hydrous silicate of magnesia, alumina, iron, soda, and potash, having a suitable flux.

It is to be understood that various other well-known fluxes and combinations of fluxes may be used instead of the flux which I have named and that the proportions may be varied, and also that the analyses of various specimens of ore may vary, the essential characteristics of the ore remaining the same.

The vitreous product varies in color, depending upon the character of the fluxes used. I have produced specimens much resembling green glass in appearance and other specimens varying in color from white to black. The material is smooth and shiny, and specimens which I have made will cut ordinary glass, and they bear a strong resemblance to obsidian and have a conchoidal fracture.

Now, having described my invention, what I claim as new, and desire to secure by Letters Patent, is—

1. A composition of matter for the manufacture of glass composed of silica, iron protoxid, iron oxid, magnesia, alumina, soda and potash, water and a flux, substantially as described.

2. The composition of matter for the manufacture of glass, composed of the following ingredients in about the proportions specified: silica, forty-six; iron protoxid, four; iron oxid, two; magnesia, twelve; alumina, eight; soda and potash, fourteen; and a suitable flux, substantially in the manner hereinbefore set forth.

3. The composition of matter for the manufacture of glass, composed of the following ingredients in about the proportions specified: litharge, two and one-half; commercial borax, two and one-half; soda bicarb., one and one-half; silica, forty-six; iron protoxid, four; iron oxid, two; magnesia, twelve; alumina, eight; soda and potash, fourteen, substantially as and for the purpose described.

CHARLES G. VAN FLEET.

Witnesses:
JAMES R. TOWNSEND,
A. C. MCKENZIE.